US008412062B2

(12) United States Patent
Kielland

(10) Patent No.: US 8,412,062 B2
(45) Date of Patent: Apr. 2, 2013

(54) PAPER PROFILE AND READING SYSTEMS

(75) Inventor: Max Kielland, Vastra Frolunda (SE)

(73) Assignee: ZIH Corp., Lincolnshire, IL (US)

( * ) Notice: Subject to any disclaimer, the term of this patent is extended or adjusted under 35 U.S.C. 154(b) by 640 days.

(21) Appl. No.: 12/569,583

(22) Filed: Sep. 29, 2009

(65) Prior Publication Data
US 2010/0092201 A1 Apr. 15, 2010

Related U.S. Application Data

(60) Provisional application No. 61/105,667, filed on Oct. 15, 2008.

(51) Int. Cl.
G03G 15/00 (2006.01)
(52) U.S. Cl. .......................................................... 399/45
(58) Field of Classification Search ..................... 399/45, 399/389, 84; 235/375; 358/1.15
See application file for complete search history.

(56) References Cited

U.S. PATENT DOCUMENTS

| 5,488,223 | A  | * | 1/1996  | Austin et al. ................. | 235/375 |
| 6,249,299 | B1 |   | 6/2001  | Tainer                         |         |
| 6,669,324 | B1 |   | 12/2003 | King et al.                    |         |
| 7,019,866 | B1 | * | 3/2006  | Beck et al. ...................| 358/1.8 |
| 7,068,380 | B2 |   | 6/2006  | Milton et al.                  |         |
| 7,248,382 | B2 |   | 7/2007  | Haines et al.                  |         |
| 2002/0170973 | A1 | * | 11/2002 | Teraura ....................| 235/492 |
| 2004/0021879 | A1 |   | 2/2004  | Castelltort et al.           |         |
| 2005/0195417 | A1 |   | 9/2005  | Shimada                      |         |
| 2006/0092452 | A1 | * | 5/2006  | Simpson ...................| 358/1.14 |
| 2006/0203075 | A1 |   | 9/2006  | Vazac et al.                 |         |
| 2006/0290770 | A1 |   | 12/2006 | LeBlanc                      |         |
| 2007/0070383 | A1 |   | 3/2007  | Fujimori et al.              |         |
| 2007/0109343 | A1 |   | 5/2007  | Geurts                       |         |
| 2008/0150994 | A1 |   | 6/2008  | Geer                         |         |

FOREIGN PATENT DOCUMENTS

EP 0 622 239 A2 11/1994
GB 2 429 093 A 2/2007

OTHER PUBLICATIONS

Partial International Search Report for Appl. No. PCT/US2009/059795 mailed Jan. 22, 2010.
TTP 2000 Kiosk Printer, Technical Manual, Swecoin, Publ. No. 103471, Ed. E, Dec. 2007, pp. 1-100.
D19C Densitometer, Ready to Meet Your Needs Today, Equipped for Tomorrow's Requirement, Gretamacbeth, 4 pages.
Swecoin US, Inc.—World Leader in Thermal Kiosk Ticket Printers: Resources: Paper spec . . . , [online] [retrieved Dec. 10, 2007]. Retrieved from the Internet: <URL: http://www.swecoinus.com/resources/paperspecs.html> 5 pages.

* cited by examiner

Primary Examiner — Walter L Lindsay, Jr.
Assistant Examiner — Billy J Lactaoen
(74) Attorney, Agent, or Firm — Alston & Bird LLP

(57) ABSTRACT

Methods, systems, computer readable media and other means for generating a profile for a particular type of media are provided. The profile represents a set of preferred printing parameters to be used to achieve a target print quality for a reference printing device. The profile may be used by other non-reference printing devices in order to optimize printing for that type of media. For each non-reference printing device, an offset may be established that represents the differences between the non-reference and the reference printing devices. A processor of the non-reference printing device may identify the type of media and the profile for that media and then adjust the printing parameters for the non-reference printing device based on the profile and the offset in order to optimize the print quality. The profile may also include a parameter that is based on a temperature coefficient associated with the type of printer.

13 Claims, 11 Drawing Sheets

| BITS | | | | | CODE |
|---|---|---|---|---|---|
| 3 | 2 | 1 | 0 | P | |
|  |  |  |  |  | 0 |
|  |  |  |  | ▨ | ERROR |
|  |  |  | ▨ |  | ERROR |
|  |  |  | ▨ | ▨ | 1 |
|  |  | ▨ |  |  | ERROR |
|  |  | ▨ |  | ▨ | 2 |
|  |  | ▨ | ▨ |  | 3 |
|  |  | ▨ | ▨ | ▨ | ERROR |
|  | ▨ |  |  |  | ERROR |
|  | ▨ |  |  | ▨ | 4 |
|  | ▨ |  | ▨ |  | 5 |
|  | ▨ |  | ▨ | ▨ | ERROR |
|  | ▨ | ▨ |  |  | 6 |
|  | ▨ | ▨ |  | ▨ | ERROR |
|  | ▨ | ▨ | ▨ |  | ERROR |
|  | ▨ | ▨ | ▨ | ▨ | 7 |
| ▨ |  |  |  |  | ERROR |
| ▨ |  |  |  | ▨ | 8 |
| ▨ |  |  | ▨ |  | 9 |
| ▨ |  |  | ▨ | ▨ | ERROR |
| ▨ |  | ▨ |  |  | 10 |
| ▨ |  | ▨ |  | ▨ | ERROR |
| ▨ |  | ▨ | ▨ |  | ERROR |
| ▨ |  | ▨ | ▨ | ▨ | 11 |
| ▨ | ▨ |  |  |  | 12 |
| ▨ | ▨ |  |  | ▨ | ERROR |
| ▨ | ▨ |  | ▨ |  | ERROR |
| ▨ | ▨ |  | ▨ | ▨ | 13 |
| ▨ | ▨ | ▨ |  |  | ERROR |
| ▨ | ▨ | ▨ |  | ▨ | 14 |
| ▨ | ▨ | ▨ | ▨ |  | 15 |
| ▨ | ▨ | ▨ | ▨ | ▨ | ERROR |

FIG. 8

PAPER PROFILE AND READING SYSTEMS

CROSS-REFERENCE TO RELATED APPLICATION

This patent application claims priority from U.S. Provisional Patent Application No. 61/105,667, filed Oct. 15, 2008, entitled "Paper Profile and Reading Systems."

TECHNOLOGICAL FIELD

The present invention relates to printing devices and, more particularly, to the creation and use of profiles for different types of media and different types of printing devices as well as to the identification of the profiles and the different types of media.

BACKGROUND

Most conventional printing devices can not be quickly and easily switched over to new applications. For example, typical conventional printing devices may require multiple adjustments and on-site calibration to optimize the quality of the printed output. Often a conventional printing device is optimized for one particular printing application, such as printing photographs, barcodes, or text. By optimizing for one particular printing application, often the printing device is or becomes less than optimal or "suboptimal" in terms of print quality for the other type of printing applications.

Moreover, other conventional printing devices may be configured to handle a wide variety of supplies or applications. Unfortunately in such printing devices the print quality is often less than optimal for all applications due to trade-offs made in the printing device to accommodate a variety of supplies. These other conventional printing devices may also be optimized for printing in a particular environment, such as moderate temperature or humidity, and thus be suboptimally configured when used in different locations or during different seasons of the year when used outside.

Managing a stock of printing supplies for known printing devices can be troublesome as well. For example, maintaining a large stock of paper, tags, cards, labels, wristbands, ribbons, or other supplies, sometimes in multiple stocking locations, is often desirable because it reduces the operational impact of running out. But many of these supplies change over time. For example, some supplies may expire while in storage, especially if exposed to suboptimal environmental conditions, such as humidity or temperature. It is also sometimes desirable to change suppliers of printing supplies for business reasons, e.g., to benefit from different pricing arrangements, delivery or stocking terms, or other supplier-specific capabilities. These changes can also create operational problems for end users with conventional printing devices, because the optimal print settings for the first suppliers' material may not be the same as those for the supplies from an alternate supplier or stock location.

Conventional thermal printers may provide unique or more challenging issues. Many types of thermal printers have attempted to compensate for the variation in print quality by providing many adjustable printer settings. For example, the operator of many thermal printers can adjust the pressure, the distribution of pressure across the printhead, darkness settings, print mode, and print speed. Indeed many thermal printers may prompt the operator for input, via lights and buttons, a front panel, or other computer-human interface terminal, and/or require the operator to adjust one or more mechanical settings. There are also attempts in the prior art to provide closed-loop feedback at the time of printing, by detecting poor print quality and intervening in the printing process by stopping printing, alerting the operator, or making minor adjustments.

Supplies manufacturers have also attempted to compensate for the variation in print quality by controlling the variation in the paper, tags, cards, labels, wristbands, ink or ribbons themselves, or by specifying a narrow set of possible products for use with a narrow range of printers. However, these efforts are sometimes at odds with the requirement for a wide variety of substrates, in many different sizes, for many different applications experienced by some end users.

SUMMARY OF THE DISCLOSURE

Embodiments of the present invention provide systems, methods, computer readable media and other means for generating a profile for a particular type of media and a printer. The profile can represent a set of preferred printing parameters to be used to achieve a target print quality for a reference printing device. The profile may be used by other non-reference printing devices in order to optimize printing for that type of media. For each non-reference printing device, an offset may be established that represents the differences between the non-reference and the reference printing devices. A processor of the non-reference printing device may identify the type of media and the profile for that media and then adjust the printing parameters for the non-reference printing device based on the profile and the offset in order to optimize the print quality for that media. The profile may also include a parameter that is based on a temperature coefficient associated with the type of printer For example, embodiments of the present invention include a method, system, computer readable media and other means for selecting a reference printing device; receiving a targeted media; printing a test pattern at a first applied energy value; printing at least one other test pattern, wherein the at least one other test pattern is printed at another applied energy value different than the first applied energy value; determining a first print quality for the test pattern at the first applied energy value; determining a second print quality for the other test pattern at the other applied energy value; printing a first test pattern at a first print speed; printing at least one additional print pattern at a second print speed; determining a print quality for the test pattern at the first print speed; determining an additional print quality for the at least one additional print pattern at the second print speed; and generating a profile for the targeted media.

As another example, embodiments of the present invention include a method, system, computer readable media and other means for receiving one or more profiles, wherein each of the profiles is associated with a type of media; receiving a media of a first type of media; identifying the first type of media; identifying a profile associated with the first type of media; adjusting at least one printing parameter of a printing device based on the profile associated with the first type of media. This may also include identifying the first type of media by reading a barcode or RFID tag associated with the media, a media provider apparatus (such as a paper feeder tray of a printer), etc. In addition, the ambient temperature of the environment can be determined prior to adjusting the at least one printing parameter; and then, if necessary, used to adjust a temperature printing parameter based on the ambient temperature. Adjusting the temperature printing parameter can comprise processing an equation that is a function of a temperature coefficient associated with the printing device.

The embodiments of the present invention can use, among other things, a printing device comprising a memory element configured to store a profile for each of a plurality of types of media; a printhead configured to print indicia on the plurality of types of media based on at least one printing parameter; and a controller. The controller can be, for example, a processor and/or other electronic device configured to, among other things, identify a first type of media received by the printing device; identify a profile stored in the memory element associated with the first type of media; and adjust the at least one printing parameter based on the profile. The controller can also be configured to apply an offset to the profile based on the printing device and/or to adjust the print speed based on the profile.

The printing device can also include an input element for receiving one or more profiles and/or a conveyance apparatus configured to convey media through the printing device. The conveyance apparatus defines a print speed.

The profile can include a strobe pattern in some embodiments. The strobe pattern can include a series of first and second pulses separated by a brief interruption.

A sensor may also be included in the printing device. The sensor can be configured to read indicia from the first type of media, generate data based on the indicia, communicate the data (wirelessly or otherwise) to the controller, which can then be configured to identify the first type of media. Similarly, the printing device can comprise a RFID reader configured to read information from a supply of the first type of media, wherein the controller is further configured to identify the first type of media in response to the RFID reader reading the information from the supply.

A temperature sensor can also be used by the printing device to determine the ambient temperature of the environment local to the printing device's printhead. For example, when the printer is placed inside a kiosk (such as those sometimes found in parking decks and train stations), the local environment can be the environment inside the housing of the kiosk. In such embodiments, a thermometer may be located in the kiosk's housing near the printhead, and used to determine the local ambient temperature inside the housing. Similarly, a thermometer can be located in proximity to the printhead, even if the printhead is not inside a kiosk. In addition to temperature, other aspects of the environment could also be measured and used to enhance anything outputted by the printing device.

Embodiments of the present invention also include a supply of a first type of media comprising: an identification means configured to be accessible to a printing device such that the printing device can identify the first type of media. The identification means can be, for example, a barcode and/or an RFID tag, which can contain a profile for the first type of media. The profile can also provide information to the printing device for adjusting one or more printing parameters of the printing device for obtaining a desired print quality.

BRIEF DESCRIPTION OF THE SEVERAL VIEWS OF THE DRAWING(S)

Reference will now be made to the accompanying drawings, which are not necessarily drawn to scale, and wherein:

FIG. 8 shows an example of a barcode translation consistent with some embodiments;

DETAILED DESCRIPTION

Figure 1:
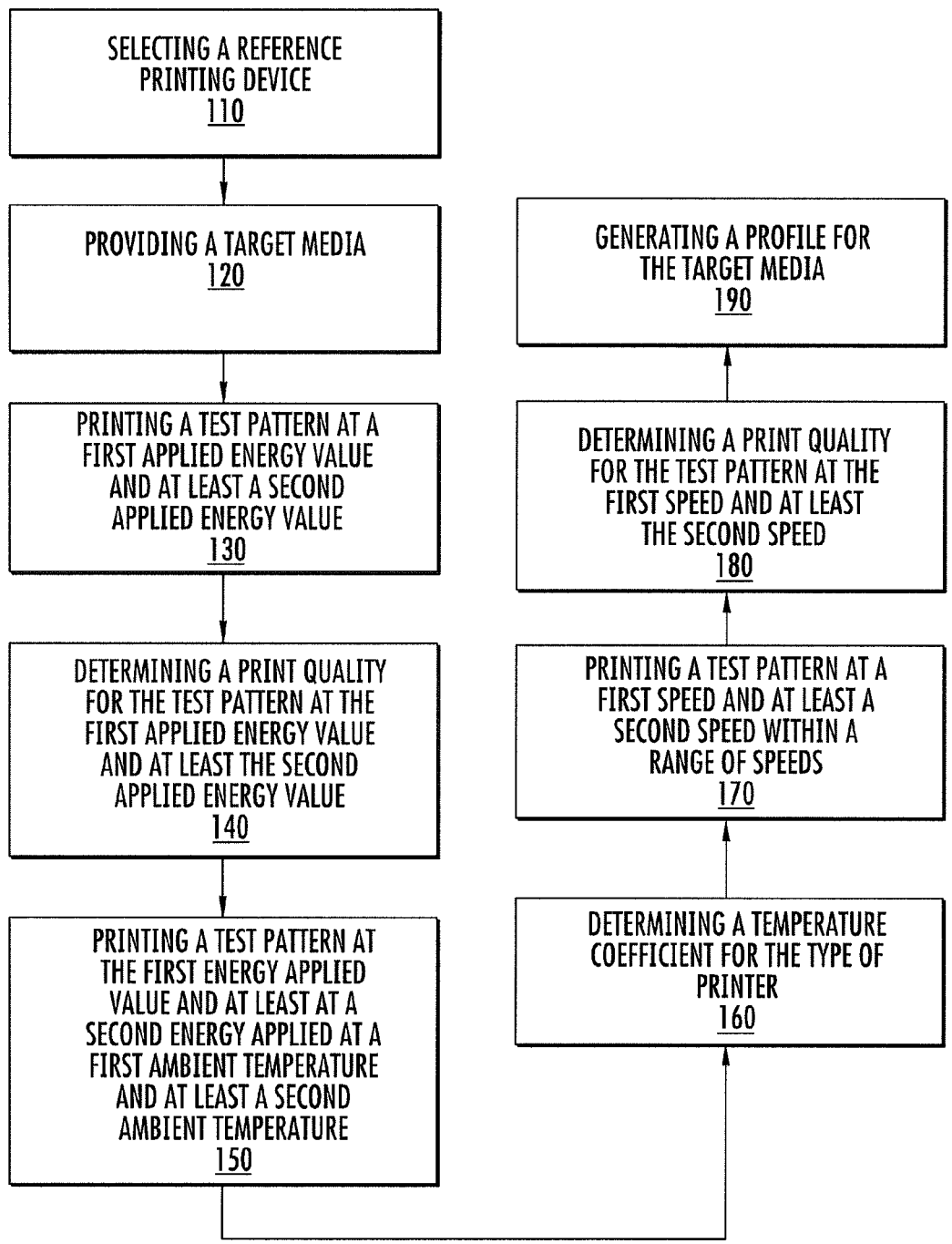
FIG. 1 shows a flow chart of a method according to some exemplary embodiments.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Printing devices, e.g., printers, copiers, and facsimile machines, are configured to print images or other indicia (typically through a printhead of the printing device) onto various types of media. The different types of media include, but are not limited to, paper based media which can vary by, thickness, width, weight, texture, and density. Examples of paper based media include, but are not limited to, glossy paper, matte paper, bond paper, which are used in books, credit card receipts, parking deck tickets, home printers, pictures, labels, stickers, etc. The media may also vary between manufacturers even if the media is intended for the same application or use. As a more specific example, the printing device may be a direct thermal printer and the media may be different types of direct thermal paper.

Print quality may be a function of several print parameters of the printing device, such as print speed and energy (e.g., heat) applied from the printhead of the printing device to the media, the particular characteristics or properties of the media and the characteristics of the environment (e.g., ambient temperature, humidity, etc.). Because the properties of media vary among types, the optimal print parameters, i.e., the parameters that will achieve a desired print quality, may vary among types of media. Moreover, due to differences among different types of printing devices (e.g., different models of printers), the printing parameters may also vary among different printing devices and/or printer models, even for the same type of media. In addition, the printing parameters may still vary depending on the ambient environmental conditions, such as the ambient temperature, even when same type of media and model printer is used.

Embodiments of the present invention are directed to, among other things, generating a profile for a particular type of media and particular model printer based on the environmental conditions. The profile represents a set of preferred printing parameters to be used to achieve a certain level of desired print quality, referred to herein as a target print quality, for a reference printing device. As discussed further below, the profile may be used by other non-reference printing devices in order to optimize printing for that type of media. For each non-reference printing device, an offset may be established that represents the differences between the non-reference and the reference printing devices. A processor of the non-reference printing device may identify the type of media and the profile for that media and then adjust the printing parameters for the non-reference printing device based on the profile and the offset in order to optimize the print quality for that media.

The profile may include an expected print quality for a particular energy applied value and/or print speed in given environmental conditions. "Print quality" may be defined by several factors or measures. In the embodiments shown herein, the print quality is simply defined by the density of the pattern.

However, it is understood that in other embodiments print quality may be defined by additional and/or different factors than density alone. For example, for machine readable indicia such as a barcode, print quality may include the blackness or density of the printed pattern, the consistency of the pattern, and/or the sharpness of the edges of the pattern. Other or additional factors for print quality, e.g., in regards to readability by a human, may include legibility, contrast compared to the indicia and background, and type of font/typeface and spacing and size thereof. As another example, print quality, e.g., for pictures, may be defined by factors such as color, color saturation, grain/sharpness, image stability, and/or the moiré effect.

Regarding reference and non-reference printers, a manufacturer of printers may have several models or types of printers in its fleet of models. The manufacturer may select a particular type or model of printer as a reference printer. The reference printer may be used to test and generate profiles for several types or kinds of media expected to be used on one or more of the different types or kinds of printers of the manufacturers. The other printers not used in the testing and/or generation of profiles are referred to herein as non-reference printers. The decision on which printer will be the reference printer may be at the discretion of the manufacturer. For example, the manufacturer may use its best selling printer as the reference printer.

FIG. 1 shows a method for generating a profile for a particular type of media, referred to as the target media. The method of FIG. 1 includes selecting a reference printing device at block 110, providing a target media at block 120, printing a test pattern at a first energy applied value and at least at a second energy applied value within a range of energy applied values at block 130, determining a print quality for the test pattern at the first energy applied value and the second energy applied value at block 140, printing a test pattern at a first ambient temperature and at least a second ambient temperature at block 150, determining at least one temperature coefficient for the type of the printer at block 160, printing a test pattern at a first speed and at least at a second speed within a range of speeds at block 170, determining a print quality for the test pattern at the first speed and at least the second speed at block 180, and generating a profile for the target media using the model printer at a detected ambient temperature within a predetermined range at block 190.

The operations of determining the print quality of the test pattern at a particular energy applied value (block 140), ambient temperature (block 160) and/or print speed (block 180) may include determining the density of the test pattern. The density of the test pattern may be determined through the use of a measuring device, such as, e.g., a densitometer or other reflective-type sensor. In some embodiments, a higher density generally indicates a higher print quality. However, in other embodiments, the best print quality may be associated with a targeted density level rather than just the highest possible density level. For example, in applications wherein the printed indicia is intended to be read by a human, the higher the density generally indicates a higher printer quality because, in general, humans like to see very black text and graphics. In applications wherein the printed indicia is intended to be machine read, e.g., a laser barcode scanner, then the best print quality may be a particular grey visible level because the laser barcode scanner can more readily read grey indicia then black indicia (i.e., the scanner has a higher read rate at more grey visible levels than black visible levels).

As illustrated in the embodiment of FIG. 1, the method includes using the reference printing device and the target media to print a test pattern multiple times (blocks 130, 150 and 170). The first series of tests may be used to determine the relationship between energy applied value and print quality (blocks 130 and 140). The second series of tests (blocks 150 and 160) may be used to determine the printer model's temperature coefficient ("k"). And the third series of tests may be used to determine the relationship between print speed and print quality (blocks 170 and 180). Other factors or characteristics that may be tested to determine relationship with print quality include, without limitation, the age of the media, the storage environment of the media (e.g., humidity and temperature), current humidity of the printing environment and/or the media, the cleanliness of the printhead, the age of the printhead, the manufacturer of the printhead, the thermo properties of the printhead (the rate at which the printhead absorbs, reflects, or radiates heat), and/or mechanical drift of the printing device (the change of properties of one or more of the mechanical parameters of the printing device over time or use). Depending on the application, e.g., barcodes, text, or pictures, the definition or the factors that define print quality may vary and may be tested accordingly.

More specifically for the first series of tests, the test pattern may be printed at a plurality of energy applied values, which may or may not be within a predetermined range of energy applied values. While the predetermined range of energy applied values may vary, the range may be based on physical limitations of the printing device and/or government regulations. The printing of the test pattern at different energy applied values may be at a constant print speed. For example, the constant print speed for the first series may be 100 mm/s.

Figure 2:
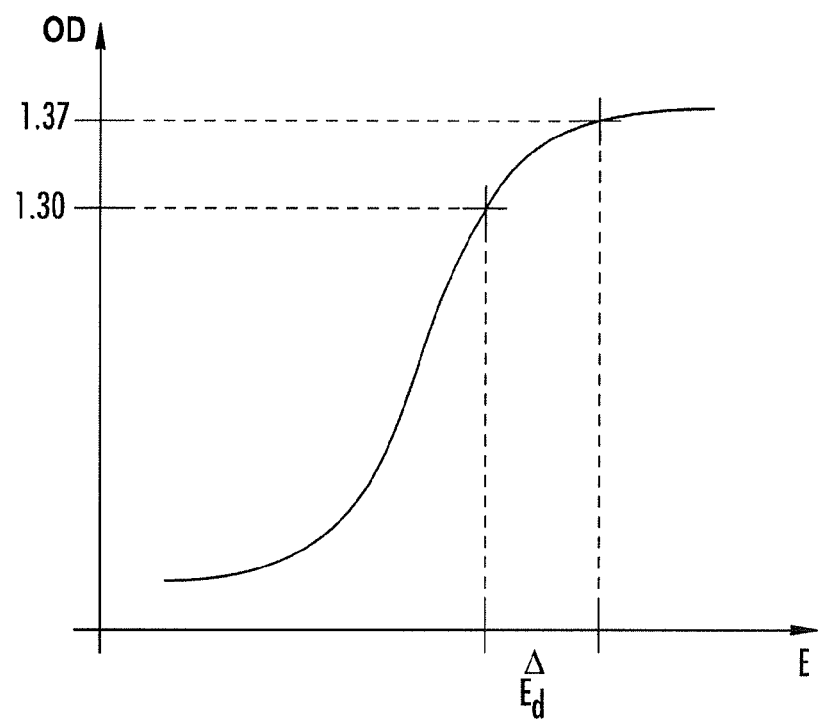
FIG. 2 shows a graph of a relationship between energy applied and print quality for an exemplary type of media.

The results of the first series of tests shown in FIG. 1, i.e., energy applied values versus print quality (blocks 130 and 140), may be tabulated and stored as part of a profile for the selected target media. Moreover, the relationship between energy applied value and print quality may be represented as a graph or graphs. For example, FIG. 2 shows print quality, as defined by opacity/density ("OD"), as a function of energy applied values for an exemplary target media. As illustrated, for at least a portion of the range of energy applied values, the print quality and the energy applied values generally have a direct relationship, i.e., the higher the energy applied value, the higher the printer quality. The portion having a direct relationship can be represented by a linear equation, as discussed further below. However, near the top and bottom of the range of energy applied values this relationship evolves such that an increase of energy applied values has a minimal or no effect on the print quality. The top of the range where the print quality substantially stays the same or changes relatively slowing compared to the energy applied value may be treated as a maximum print quality for the reference printer and the target media. For example, in the illustrate example, the maximum print quality may be treated as 1.37 OD. Many media types have a similar relationship between print quality and energy applied values as illustrated in FIG. 2.

Energy applied value may be expressed by a theoretical energy transferred from the printhead to the paper. It may be considered theoretical because the energy applied value may be calculated as a function of, e.g., resistance of the printhead, voltage, and time. The energy applied value does not necessarily include potential losses within the device. Resistance and voltage may be fixed so the parameter that is changed to control the energy applied is time. Time may be considered the pulse width for the heat elements radiating the energy to the paper. The energy applied value may be expressed in Joule per square millimeters. Rather than focus on absolute values, it may be more beneficial to discuss relative values, e.g., whether the energy value is higher or lower than another value, for the purposes of this description. The energy applied values are also proportionate to and, therefore, can be represented by the amount of time electrical current is provided to the printhead. Therefore, the energy applied values are sometimes referred to herein in units of time, such as in microseconds. For example, a range of energy applied values could be 50 μs to 600 μs.

Next, referring back to the second series of tests of FIG. 1, i.e., ambient temperature's affect on print quality, blocks 150 and 160 are discussed in more detail. Similar to how print quality can be impacted by the energy applied value, the ambient temperature can also effect print quality. The ambient temperature represents the heat energy (or absence thereof) in the area surrounding the printer and the target print media. The area surrounding the printer can be, for example, the temperature of a room or the temperature outside (such as when the printer is located outside, e.g., in a public parking garage). The area surrounding the printer may be referred to as the local environment.

A decrease in the ambient temperature can cause some printers to output a lower print quality when all other variables (print speed, energy applied value, etc.) remain constant. Likewise, increasing the ambient temperature can cause some printers to output a higher print quality when all other variables remain constant. Accordingly, embodiments of the present invention can account for ambient temperature.

One method of compensating for ambient temperature is by determining the ambient temperature local to the printhead (using, e.g., an integrated thermometer), determining whether the local ambient temperature will impact the print quality (e.g., 1 degree Celsius may not, while 40 degrees Celsius likely will), and then, if necessary, adjusting the energy applied value based on the ambient temperature when printing. For example, as the ambient temperature increases, the applied energy value may be decreased without sacrificing printer quality. As another example, as the temperature of the environment decreases (which can affect the temperature of the print media and/or printhead), the applied energy value can be increased to compensate for the potential reduction in the printer's performance. (As referred to herein, the increase and decrease in temperature can be an absolute value or a relative value as compared to the temperature used when the printer's profile was created and/or calibrated.) Similarly, print speed can also be used to compensate for ambient temperature, as the printhead becomes heated when it moves faster and cools quicker when it moves slower.

When the energy applied value is being used to compensate for the ambient temperature, the profile and printer's circuitry can be configured (which as used herein includes, specially programmed, specially hardwired, any combination thereof, etc.) to execute mathematical calculations. A mathematical equation, which serve as the basis of the calculations, correlates the ambient temperature with the energy applied value that affects the quality of print media outputted by the printer. Said another way, the quality of the transformation from electrical data to printed media can be controlled by the mathematical equation. For example, similar to what is shown in FIG. 2, many printers have a relatively linear relationship with regards to how temperature affects print quality and, therefore, controlling the energy applied value can directly compensate for a change in temperature. The linear equation can be represented by: $OD=(k)(E)+n$, wherein k and n are the temperature coefficients for a particular type of printer (which is sometimes referred to herein as the "model" of printer). OD and E are discussed in greater detail below in connection with, e.g., FIG. 2.

The k and n coefficients can be determined by printing test samples at various temperatures (e.g., each degree or every so many degrees, such as 2 or 5 degrees Celsius, between, for example, −10 degrees Celsius and 60 degrees Celsius), while controlling other factors (such as print speed and energy applied value). The print samples can then be analyzed and assigned a numeric value representing the print quality of each test sample. The numeric values can then be plotted, based on their corresponding ambient temperature, as points on a graph. A linear standard deviation equation of the points can often be used to provide the k and n coefficients.

Now, referring back to the third series of tests of FIG. 1, i.e., print speed v. print quality, the process of blocks 170 and 180 are discussed in more detail. The test pattern may be printed at a plurality of print speeds, which may or may not be within a predetermined range of print speeds. While the predetermined range of the print speed may vary, the range may be based on the mechanical limitations of the printing device. For example, the printing device may include a motor for driving the media through the printing device. The motor may be configured to operate within a range of speeds. As another example, the printing device may include a printhead for printing the pattern or other indicia. The printhead may also have limitations regarding minimum and maximum speeds that can define the range of print speeds. Also, in some particular printing devices, certain print speeds may be near a resonance frequency which may cause the printing device not to perform well or cause other problems such as noise. In such cases, these certain print speeds may be avoided even if the print speeds are within the range of print speeds for the test. An exemplary range of printhead test speeds could be 50 mm/s to 150 mm/s.

While the print speed may vary between the tests during the third series (blocks 170 and 180), the energy applied value and environmental conditions maybe controlled and remain constant. For example, the energy applied value during the third series test was the lowest value that obtained the maximum print quality during the first series of test at 20 degrees Celsius. In other words, the lowest amount of energy that obtained the best print quality in the first series of the test became the constant energy value for the third series of the test. However, the selection of the constant energy applied value for the third series test may vary between embodiments. Rather than using the lowest energy applied value that obtained the maximum print quality in the first series test, another value may be selected. For example, the manufacturer of the printer may have one or more other criteria, such as a preferred energy applied value according to the design of the printer, for selecting the constant energy applied value for the second series of test.

Figure 3:
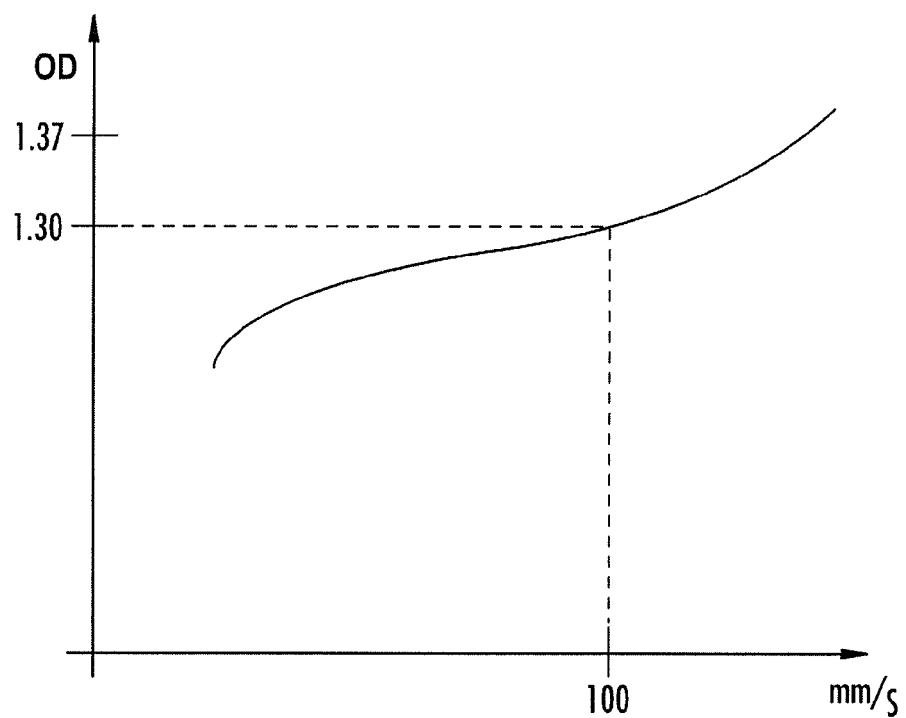
FIG. 3 shows a graph of a relationship between print speed and print quality for the media of FIG. 2.

The results of the second series of tests may be tabulated and stored as part of a profile for the selected target media. Moreover, the relationship between print speed and print quality may be represented as a graph or graphs. For example, FIG. 3 illustrates print quality, as defined by OD, as a function of print speed for an exemplary target media. As illustrated, as the print speed increases, the density level generally increases. This generally direct, linear relationship is true because as the print speed increases, the printhead of the printing device has less time to cool off or lower its temperature and, thus, the printhead temperature remains relatively high which promotes high print quality. Many media types have a similar relationship between print quality and print speed as illustrated in FIG. 3. As discussed above, in other embodiment other factors may be tested to determine relationship between the factors and/or the print quality including, but not limited to, characteristics of the printhead, the ambient temperature, and/or the temperature of the media supply. Also, the order of the first, second and third series of tests can be rearranged and/or one of the series of tests can be omitted entirely.

Figure 6A:
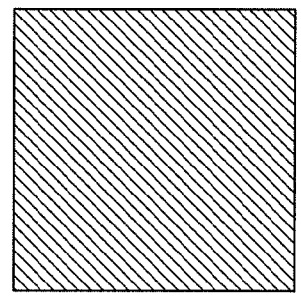
FIG. 6a shows an example of a test pattern.
Figure 6B:
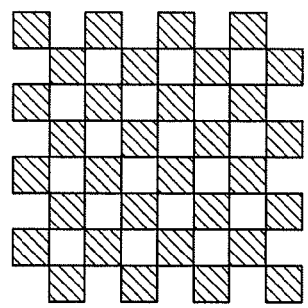
FIG. 6b shows another example of a test pattern.

The test patterns, also referred to sometimes herein as test samples, may vary. However, for examples, the test pattern may be a 10×10 mm square as illustrated in FIG. 6a or the test pattern may be a 8×8 pixels repeated over as 10×10 mm area (i.e., 80×80 pixels) as illustrated in FIG. 6b. A purpose of the second example may be to establish an energy value for a history pulse. Also, although some embodiments generally describe printing a test pattern multiple times, in other embodiments more than one type of test pattern may be utilized.

Referring back to the method shown in FIG. 1, the profile for the targeted media is generated based on the information obtained through the printing of the test pattern at different energy applied values and print speeds on the reference printing device. Although, the examples above discuss three sets of tests, the first set having a variable applied energy value, the second having a variable temperature, and the third having a variable print speed, in other embodiments, a single set of tests may be performed in which the print speed, temperature and applied energy values are varied among tests. In such embodiments, multivariate testing (e.g., designs of experiments) may be employed to determine the relationships or functions of print speed, ambient temperature (and/or other environmental conditions), and applied energy values versus each other. Moreover, a plurality of tests may be performed and the information or data obtained during the tests may be used to extrapolate values for particular values of print speed, temperature and/or energy applied that were not tested.

The operations of determining the print qualities for the plurality of tests and generating a profile may be performed through the hardware of the printing device or hardware connected to or in communication with the printing device, software, or a combination thereof. Therefore embodiments may take the form of hardware systems, such as the printing device or another computer apparatus, software, or combinations thereof. As an example, embodiments may include a computer program (e.g., software) product stored on a computer-readable storage media comprising of one or more executable portions for performing the operations described herein. As another example, the printing device or other computer apparatus in communication with the printing device may include a processor, circuitry, other electrical components (such as a thermometer), and/or one or more memory elements. The processor, for example, may be embodied as a coprocessor, a controller or various other processing means or devices including integrated circuits. The processor may be configured to perform one or more of the operations discussed in FIG. 1 or elsewhere herein, including storing information, such as the test results and the profile in a memory element or other component of the printing device or other computer apparatus (such as, e.g., a remote, network server and/or printer).

Once the profile for the targeted media has been generated, it may be stored for later retrieval by one or more other printing devices or other computer apparatuses. According to some embodiments, the media profile may be stored on a storage device located in the reference printing device. According to another embodiment, the media profile may be stored on a storage media of another computing device connected to the reference printing device. According to yet another embodiment, the media profile may be stored in a data structure such as, for example, a database. The data structure may reside in the reference printing device or in another computer apparatus (e.g., a server) or on the media or the supply of media (e.g., an RFID tag attached to a supply roll).

Once the profile for the targeted media has been generated, the profile may be sent and/or received by other printing devices. For example, a printer device may receive the profile over a network, such as the Internet or an Intranet (either through a wired or wireless connection (e.g., Bluetooth, WLAN)), or through a computer readable media, such as a DVD, CD, disk, zip drive, RFID, flash memory device, etc. The printer device may have a USB, a serial port, parallel port, other input port, or combination thereof for receiving the profile. The profile may be received or downloaded by the manufacturer of the printer, e.g., as a pre-installed driver or other type of software, be hardwired into the printer, or may be received by the user of the printer, e.g., as a driver, software update, or hardware add-on. The profile or information regarding the profile may be received through, for example, the input of information by a user, such as through an input device (e.g., a keyboard). As a more specific example, the printing device may be an outdoor kiosk printer, such as a direct thermal printer. In such an example, the printing device may be configured to support several different types of media from several users in various environmental conditions. The kiosk printer may have been installed with one or more profiles at the manufacturer and/or download and receive one or more profiles once it is in the field (e.g., at a drug store or train station). With the plurality of profiles, the kiosk printer may be able to support the several different types of media in varying environmental conditions and also be updated to support additional media types.

In view of the foregoing, one would understand that for a given printer in the field, such as in commercial use (e.g., a kiosk printer in a drug store), the printer may store several profiles corresponding to several different types of the media. For example, the printer may include at least one memory element dedicated to storing profiles.

Embodiments may further include identifying a desired print quality. The desired print quality may be the maximum print quality as described above. Therefore, in the example of the illustrated embodiment, the desired print quality may be identified as 1.37 OD. But again, this is only an example. In other embodiments, the target print quality may be selected by, e.g., a manufacturer of the printing device, a manufacture of the targeted media, or the intended user of the printing device and/or of the targeted media.

Referring back to FIG. 3, in this example, the profile provided that for this particular type of media, the targeted print quality level is 1.37 OD. The default print speed for this particular type of media may be 100 mm/s. However, according to the profile illustrated in FIG. 3, at a print speed of 100 mm/s, the expected print quality level is only 1.30 OD. Therefore, in this circumstance, the printing device is expected to have a print quality level less than the targeted print quality unless adjustments are made to at least one of the print speed or the energy applied.

Referring back to FIG. 2, the energy applied can be adjusted to achieve the targeted print quality. Specifically, in this example, the following relationship exists: $E=E_t+E_d+E_c$. E equals the actual energy applied value. $E_t$ equals the energy applied value that is expected to achieve the targeted print quality, such as 1.37 OD, according to this example. $E_d$ equals an offset for this non-reference printing device compared to the reference printing device. The profile can correspond to a reference printer that may differ from the non-reference printer. For example, the printers may be different models or have different manufacturers.

$E_d$ can be an offset value that represents the inherent differences of different printers. The factors that create the offset may differ including different efficiencies (e.g., one may have a high power loss between the power source and the printhead). The offset between the reference printing device and the non-reference printing device may be treated the same for each profile and, thus, each type of media. In other words, the offset may be a constant for this particular non-reference printer.

Figure 4:
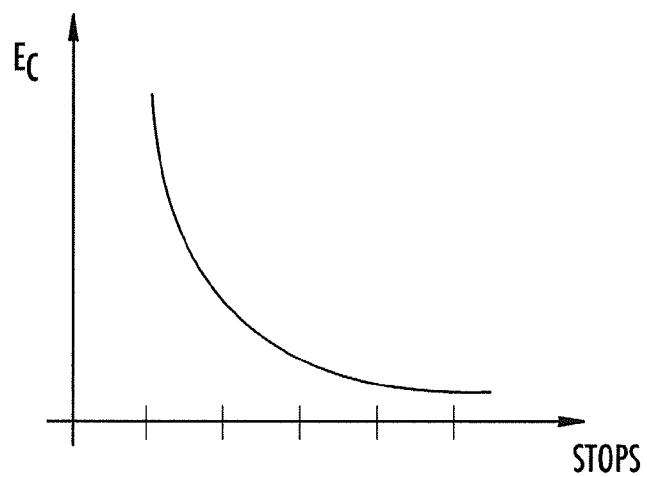
FIG. 4 shows a graph of the energy compensation for a cold printhead at the beginning of a print job.

$E_c$ refers to a cooling effect. As mentioned above, a relatively high temperature at the printhead often encourages a high print quality. Therefore, a cooling of the printhead, such as between prints, often decreases print quality (when, e.g., temperature and other variables remain constant). To compensate for the cooling in such embodiments, more energy may be needed to overcome the cooling of the printhead. This relationship is shown in FIG. 4. More specifically, FIG. 4 shows the energy compensation for a cold printhead at the beginning of the print job or other situation when the printhead is considered cold, i.e., has not burned any pixels for a while. Based on the foregoing relationships, the energy applied may be adjusted in order to achieve the targeted print quality. Alternatively, rather than or in addition to adjusting the energy applied, the print speed may be adjusted using the profile.

Referring back to the offset for the differences between the non-referenced printer and the referenced printer, the $E_d$ offset may be determined through a series of testing between the referenced and non-reference printer. In the printer manufacturer example, when a new or different printer model is available, the manufacturer may run a series of tests with the new model and compare the profiles of the new model to the reference printer to determine the "offset relationship" between the two. The offset relationship may be linear or non-linear, and may or may not be temperature dependent. Once the offset relationship is determined, the new non-reference printer may store the offset relationship such that the non-reference printer (e.g., the processor of the non-reference printer) can apply the offset relationship when adjusting the non-reference printer for a particular type of media in view of the profile for that particular type of media and the reference printer.

Figure 5:
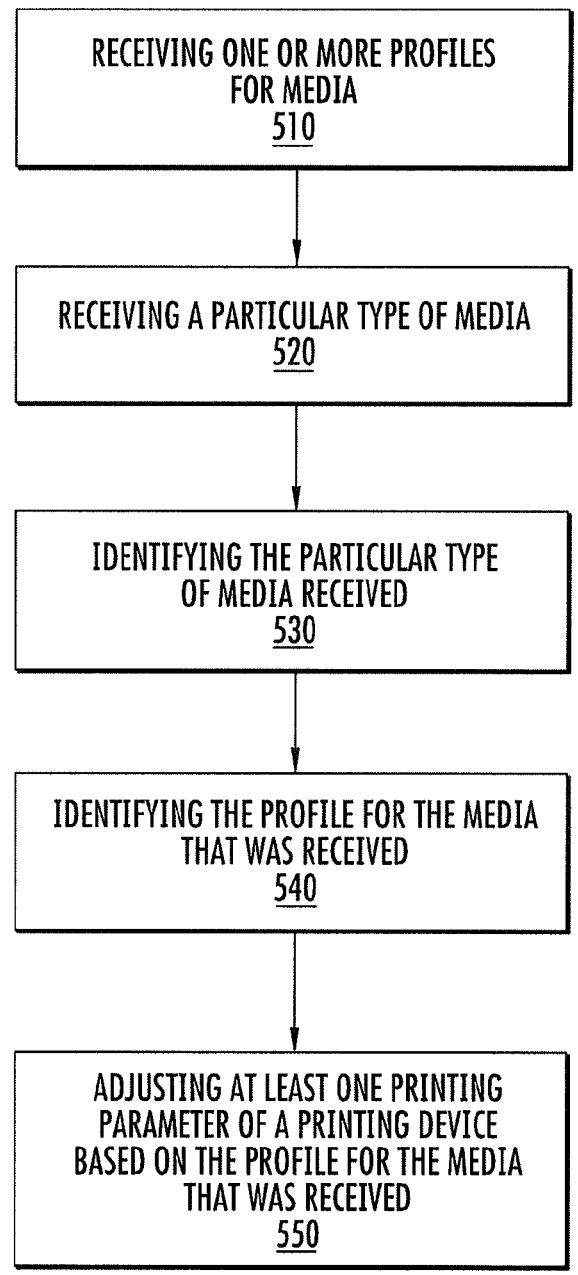
FIG. 5 shows a flow chart of a method according to exemplary embodiments.

FIG. 5 shows another method according to exemplary embodiments that relates to using the profile of the target media to calibrate a printing device. According to these embodiments, one or more parameters of the profile may be used to adjust one or more parameters of the printing device in order to achieve a desired or targeted print quality. In this regard, the printing device performs adjustments or calibrations for the media based on the profile. The method may include receiving one or more profiles for media at block 510; receiving a particular type of media at block 520; identifying the particular type of media received at block 530; identifying the profile for the media that was received at block 540; determining the environmental conditions that may impact the print quality (such as ambient temperature), and adjusting at least one printing parameter of a printing device based on the profile for the media that was received at block 560. As an example, at least one of the print speed and energy applied value may be adjusted.

The identifying of the media at block 510, like the other blocks of methods discussed herein, may be performed using various means and elements. For example, the printing device may include a user input element such as a keypad or keyboard. The user may enter the information regarding the received or loaded media allowing the printing device or, more specifically, a processor of the printing device, to identify the media. As another example, the printing device may include one or more sensor devices or elements (such as reflex sensors and gap sensors) that can sense or detect a characteristic or marking on the loaded media that allows the processing element to identify the loaded media. In particular, each media may have a barcode or other indicia that is readable via sensor or sensors of the printing device that contains information such as, but not limited to, the identity of the media, identity of the type of media, and/or the identity of the profile for the media.

Instead of or in addition to containing information about the profile, the media may have a barcode readable by the printing device that represents other information about the media that can be used to adjust the parameters of the printing device accordingly. For example, according to some embodiments, a media may have a first black mark, e.g., a first black mark having a predetermined density, followed by one or more fields (e.g., 3). Each field can represent a bit having a value of 0 if the field is empty or 1 if the field is filled with black. The fields, collectively and/or individually, may be read to determine a total value which could be used as an index to indicate one or more parameters. For example, the parameters may be one or more of the following: paper size, black configuration, system bits, presenter on/off, max print speed, cut offset, an index in a burn table, and a profile as discussed above.

In some embodiments, the barcode may only be read or scanned when the media are loaded and/or when the printing device is turned ON. The printing device may contain software and/or firmware that instructs the printing device or the processor of the printing device to, e.g., search for a barcode or other indicia on the media through one or more sensors. For example, the instructions may include searching two consecutive media for a barcode. The barcode may include at least one parity bit, checksum bit and/or error correction bit. In response to a parity error, the printing device may be instructed to extend the search for the barcode to additional media, e.g., from two sheets of paper to three sheets of paper. In response to an error or failure to read the barcode, the printing device may be instructed to enter into an error state until the media is reloaded or the printing device runs through a power cycle.

According to some embodiments, the printing device may include more than one tray or other infeeder component(s), wherein each tray may have the same or different types of media loaded than the other trays. The printing device may be configured to link the profiles of the different media with the trays. In some embodiments, for example, a first tray may contain a first type of media and a second tray may contain a second type of media. In this regard, when the first tray is selected to process a print job, the printing device may be configured to switch to the corresponding profile for the first type of media and adjust one or more of the printing parameters accordingly. Likewise, when the second tray is selected to process a print job, the printing device may be configured to switch to the corresponding profile for the second type of media and adjust accordingly.

In other embodiments, a particular tray may contain one or more different types of media. In such embodiments, the printing device may be configured to identify the type of media for each sheet or unit of media, the thickness of the media, and/or the width of the media and switch to the corresponding profiles.

According to yet other embodiments, the printing device may be configured to continuously, e.g., for each sheet of paper, identify the type of media. As such, for each sheet, the printing device may be configured to determine the proper profile and adjust one or more of the printing parameters accordingly. Alternatively, in some embodiments rather than relying on the generated profiles as discussed above, the printing device may store and use burn and look-up tables.

The continuous identification of the type of media may provide a virtual infeeder tray system. For example, in some printing devices, the printing devices may have a plurality of trays wherein each tray contains and stores a particular type of media. Moreover, the printing device may store instructions for processing and printing on the media from the different tray. For example, the instructions may provide that the media in tray one is "A4" paper and the media in tray two is 8½ by 11 paper. Rather than rely on a system that requires a plurality of trays and for the printing device to be adjusted by tray, the continuous identification allows the printer device to be adjusted by the individual sheets of media.

As mentioned, a barcode may be used to provide means for identifying the media, regardless if the operation of identifying the media is continuous or more selective. The information from the barcode may be indirect. For example, the barcode may provide a number that can be used as an index by the printing device (or, more specifically, a processor of the printing device) for matching a generated profile as discussed above or a burn table or some other type of look-up table.

Figure 7:
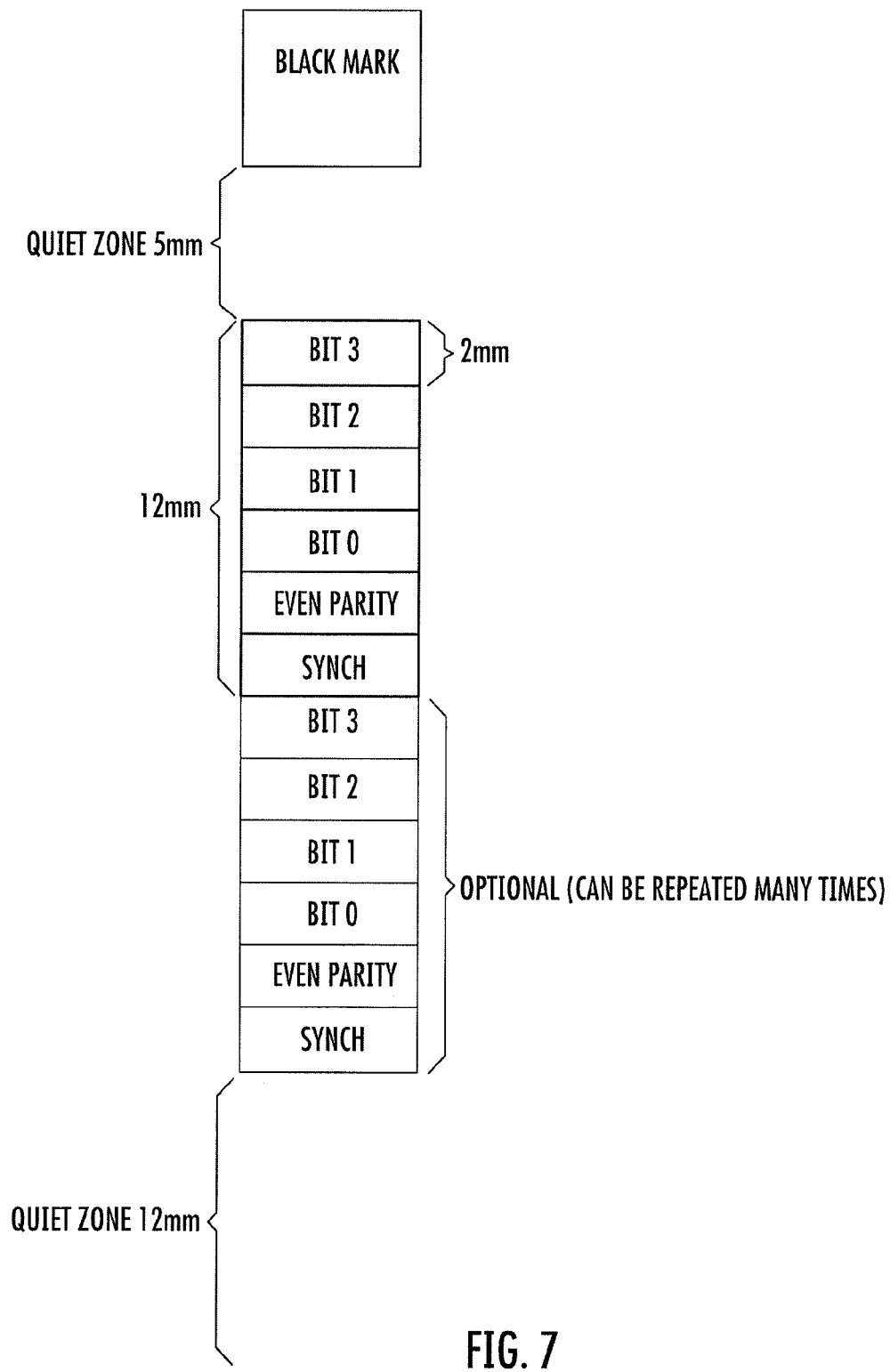
FIG. 7 shows an example of a barcode consistent with some embodiments.

FIG. 7 shows an example of a barcode according to some embodiments. The barcode may include a black mark for calibration purposes. Following the black mark, the barcode may include a first quiet zone (e.g., a blank space having a length of five millimeters) so any calibration routine associated with the black mark may more easily detect a trailing end of the black mark. The individual fields of the barcode may include one or more characters. For example, a character may be represented by twelve millimeters length divided into six by two millimeters slots as shown in FIG. 7. A filled slot (i.e., a black slot) may be read as a one and a blank slot may be read as a zero. Therefore, as shown in FIG. 7, each character includes six slots; four data bits (most significance bit ("MSB") to least significance bit ("LSB")), one parity bit and one synch bit. Multiple character's data bits may be shifted together to form a four bit, eight bit, twelve bit (and so on) values. It is understood that the illustrated barcode is an example and that one skilled in the art may use any type of barcode including, including those not limited to, two-dimensional, visual light-spectrum barcodes.

The parity bit may be zero, so paper without a barcode may be detected as zero without error. The synch bit may be the inverse of the parity bit if another character is to be expected. If no more characters are to be expected, the synch bit may be the same as the parity bit to indicate the end of the barcode. Synchronization may be done on an edge between the parity and synch bar and may reset a barcode step counter of the printing device to ensure that the barcode engine does not get out of synch if the barcode grows in length. After the parity and synch bits, the barcode may further include a second quiet zone of one or more character slots for resynchronization in response to determining there is a parity error. For example, in the embodiments shown by FIG. 7, the quiet zone may have six slots representing four data bits.

The printing device may include one or more sensors for detecting or reading barcodes, which can include detecting black marks. For example, upon detecting the first black mark, a barcode engine of the printing device may first count the quiet zone and then sample every two millimeters incremently for each slot (e.g., of the six slots). A slot may be read as a one if a minimum of a one millimeter length is black allowing the bar code engine (or sensor) to be a maximum of one millimeter off position and still be able to read the barcode. In the illustrated embodiment, after the fifth parity slot has been read (e.g., detected and analyzed), the printing device (e.g., more specifically a processor of the printing device) may check the four previous data bits. If a parity error is present, an index error may be determined. For example, FIG. 8 shows an example of a barcode translation consistent with some embodiments.

If a parity error is not present or the barcode is otherwise considered valid, the synch slot may be sampled and, if no edge is detected or found between the parity and synch slot, then the printing device may determine that the barcode is done or the reading of the barcode completed. If an edge is detected (e.g., the synch slot is the inverse of the parity slot), the barcode counter of the printing device may reset on the edge and synch slot is passed and the next character may be read.

In instances in which a parity error is encountered, the printing device may not know if the barcode is completed, i.e., whether there are more characters to be read. One method to allow the printing device to get back into synch again with the barcode is to reset the barcode step counter each time the printing device encounters a 1 to 0 transition. One method of ensuring the barcode is completed is configuring all six slots (e.g., all four data slots, the parity slot, and the synch slot) as zero. When all six slots have been sampled and all read as (e.g., detected and determined to be) a zero, the printing device may determine that it has passed the barcode area of the media and enter an idle state until, for example, another black mark is detected.

Figure 9:
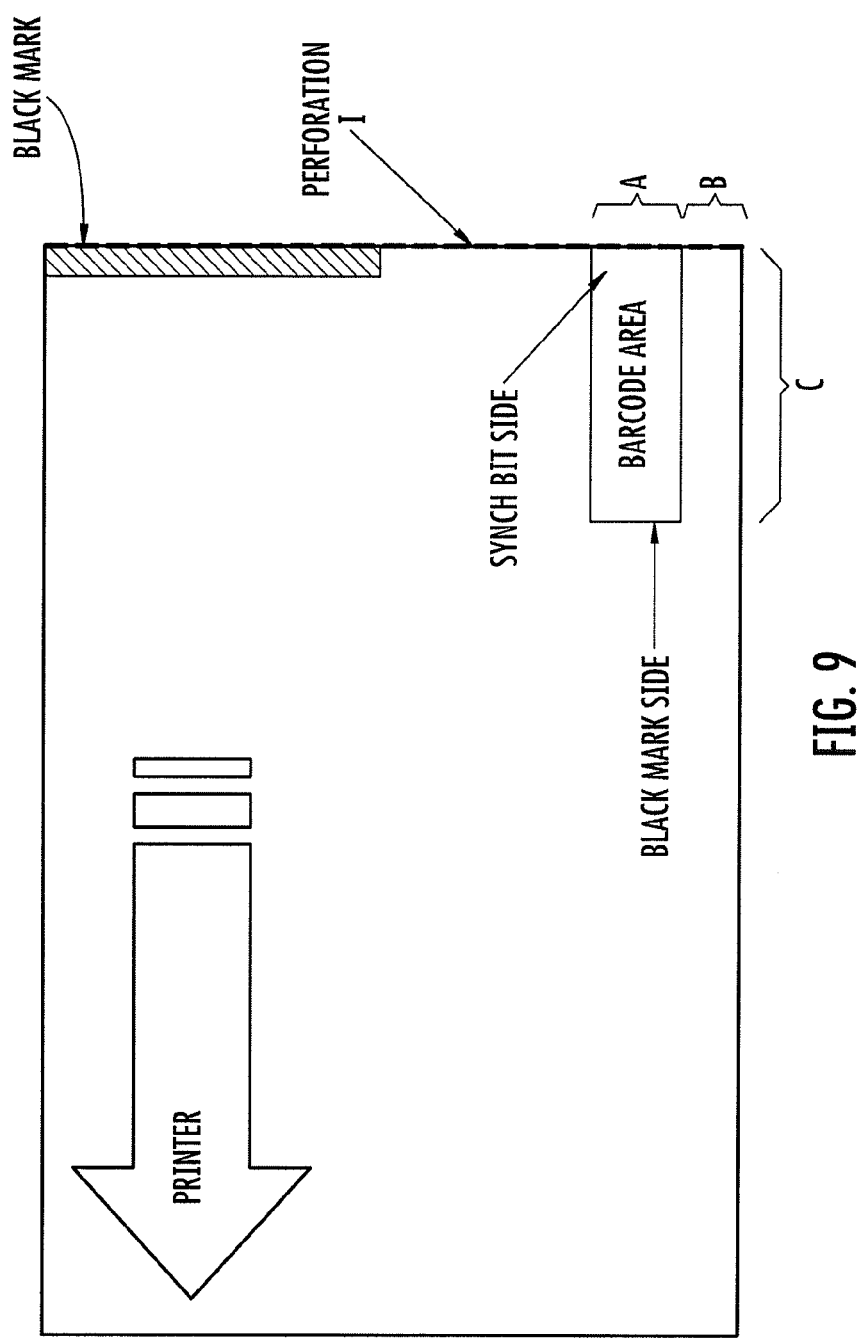
FIG. 9 shows an example of a placement of a barcode on media.

FIG. 9 shows an example of a placement of a barcode on a medium. In this example, the barcode extends from a perforated edge of the medium. The edge also includes a black mark. The bar code has a width of "a" and a length of "c." Also shown is distance "b" from a side edge of the media to the bottom of the barcode area.

In general, as explained above, placing a barcode on the individual medium allows the printing device to identify the type of media unit. The identification may be used in a calibration process of the printing device, including, but not limited, in conjunction with a generated profile as described herein or in conjunction with a burn or look-up table. The generated profiles refer to the method of generating a profile for, e.g., a particular type of media with a reference printer and then applying it to non-reference printing device which may include using an offset that represents differences between the reference and non-reference printing devices. For the generated profiles, each media is calibrated to the printing devices. A burn table is a table that provides preferred printing parameters of a number of media provided by the media providers or in some cases by a printing device manufacturer and is not tied to or corresponds to reference and non-reference printing devices.

Figure 10:
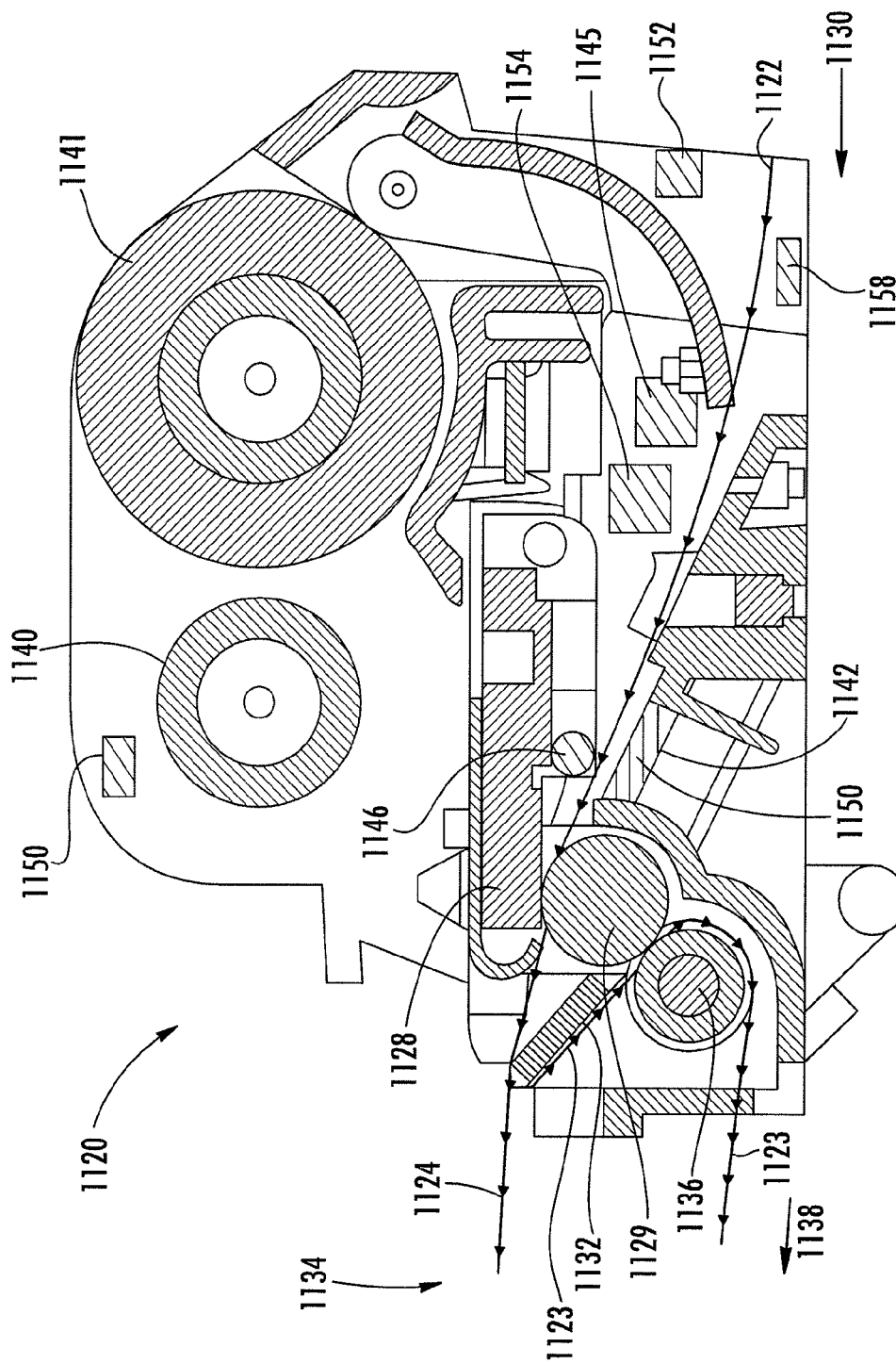
FIG. 10 shows a schematic representation of a printing device consistent with some embodiments.

FIG. 10 shows an example of a printing device that may benefit from the use of the profiles disclosed herein. The printer device 1120 may include several components, such as a printhead 1128, a platen roller 1129, a feed path 1130, a peeler bar 1132, a media exit path 1134, rollers 1136, a carrier exit path 1138, a ribbon take-up spool 1140, a ribbon supply roll 1141, a reader 1142, a controller 1145, and, among other things, a conveyance system 1146. In general, the printing device 1120 is configured to process a series of media units such as labels, cards, etc, that may be carried by a substrate liner or web 1122. The conveyance system 1146 is configured to direct the web 1122 along the feed path 1130 and between the printhead 1128 and the platen roller 1129 for printing indicia onto the media units 1124. The ribbon supply roll 1141 provides a thermal ribbon (not shown to avoid overcomplicating the drawing) that extends along a path such that a portion of the ribbon is positioned between the printhead 1128 and the media units 1124. The temperature of printhead 1128 is elevated and then printhead 1128 presses a portion of the ribbon onto the media units 1124 to print indicia. The take-up spool 1140 is configured to receive and spool the used ribbon. This printing technique is commonly referred to as a thermal transfer printing. However, other printing techniques may be used such as direct thermal printing. In direct thermal printing, the printhead presses directly against and heats coated media without the use of an intermediate ribbon. Other examples of printing techniques that may be used include, without limitation, inkjet printing, dot matrix printing, laser printing and electro-photographic printing.

After printing, the media unit web 1124 proceeds to the media exit path 1134 where the media units are typically individually removed from the web 1122. For example, in one embodiment, pre-cut media units 1124 may be simply peeled from the web 1122 using the peeler bar 1132 as shown. In other embodiments, a group of multiple media units may be peeled together and transmitted downstream to an in-line cutter for subsequent separation (not shown). Various other media unit removal techniques may be used as will be apparent to one of ordinary skill in the art. In applications, such as the depicted embodiment, in which the media units 1124 are supported by a web 1122, the web 1122 may be guided along a path toward the carrier exit path 1138 by rollers 1136 or other devices once being separated from the media units.

As the media units 1124 travel between the printhead 1128 and the platen roller 1129, the tension between the platen roller 1129 and the media units 1124 may vary. For example, the media units 1124 may travel in a general linear path from the nip defined by the printhead 1128 and the platen roller 1129. In such an environment, the media units may exert minimal tension unto the platen roller. As another example, soon after exiting the nip, the web or liner 1122 may be peeled away from the media units 1124 and the liner 1122 may be routed along a sharp curved path relative the platen roller 1129 (as shown in FIG. 10). In this environment, the liner 1122 may exert more tension of the platen roller 1129 compared to the first example. In yet another example, in some embodiments, the media units may be rewound through the printing device which may also exert tension on the platen roller 1129. In general, an increase in tension on the platen roller 1129 may require that more pressure or heat be applied by the printhead to achieve the same print quality as if there was no tension. Therefore, a factor that might be considered during the printing operations is the existence of the tension on the platen roller 1129 exerted by the media units.

As mentioned above, the printing device may also include a user input element 1150 (e.g., a keypad, touch sensitive interface, etc.), an input port 1152 (e.g., a USB port), a memory element 1154, and at least one sensor 1158. Among other things, the input element 1150 and/or the input port 1152 may be configured to receive information regarding the type of media and/or the profile for that type of media. The sensor 1158 may be able to identify the particular type of media or other information from the media, e.g., the sensor 1158 may be a barcode sensor 1158 that can read a barcode on the media. In another embodiment, the printing device may include an RFID reader 1150 that can read information from an RFID tag attached to the media or attached to the supply of media. The RFID tag may contain information such as profiles and/or type of media. Once received, the profile or profiles may be stored in the memory element 1154 and be accessible to the controller 1145.

The controller 1145 may be configured to access the information such as profiles and type of media in order to synchronize or adjust the printing operations. As in the above examples, the controller 1145 may change one or more printing parameters based on a profile and type of media. The controller 1145 may control the conveyance mechanism to start, change speed, or stop movement depending on, e.g., the desired print speed, increase or decrease of the energy applied to the printhead, and/or generate messages to an operator using a user display screen. In instances, in which the controller 1145 lacks certain information, e.g., a profile for a particular media, the controller 1145 may send a request for the profile. The request may be a message to an operator or to another computing device such as a server of the printing device manufacturer. In the last example, the controller 1145 may send the request over a network, e.g., the Internet, to the server.

Referring back to changing printing parameters, one method may be to provide a particular strobe pattern to the printhead. A printhead may have one or more heating elements arranged in rows. Each heating element is configured to print a pixel of an image. Rather than activate, e.g., increase the temperature of, each heating element of a row, the heating elements may be selectively activated. The heating elements can be heated through a series of driving circuits. Each driving circuit can be configured to communicate with a certain number of heating elements per row. For example, a printing device may have a first driving circuit in communication with 25 percent of the heating elements of a row (referred to as a first set of heating elements), a second driving circuit in communication with another 25 percent of the heating elements of the row (referred to as a second set of heating elements), a third driving circuit in communication with yet another 25 percent of the heating elements of the row (referred to as a third set of heating elements), and a fourth driving circuit in communication with the last 25 percent of the heating elements of the row (referred to as a fourth set of heating elements). In order to active a set of heating elements, a strobe signal is sent along one of the driving circuits which activates the heating elements in communication with the driving circuit. The strobe signal is essentially electrical energy sent through a driving circuit that activates the heating elements. The controller 1145 may be configured to control the timing of the strobe signals including the duration for any given strobe signals. The power source of the printing device such as a battery, a power source circuit, an external power source, or another type power source unit (PSU) may provide the energy.

At any given time, all the heating elements of a row may be activated by sending a strobe signal along each of the driving circuits. However, this would consume power and could quickly drain the power source. It may also create a large voltage drop which could have a detrimental effect on the printing operations. Alternatively, only one section of the heating elements can be activated at one time, although this may conserve energy, it may require more time for the printhead to heat up sufficiently such that it transfers enough heat or energy to the media.

Figure 11:
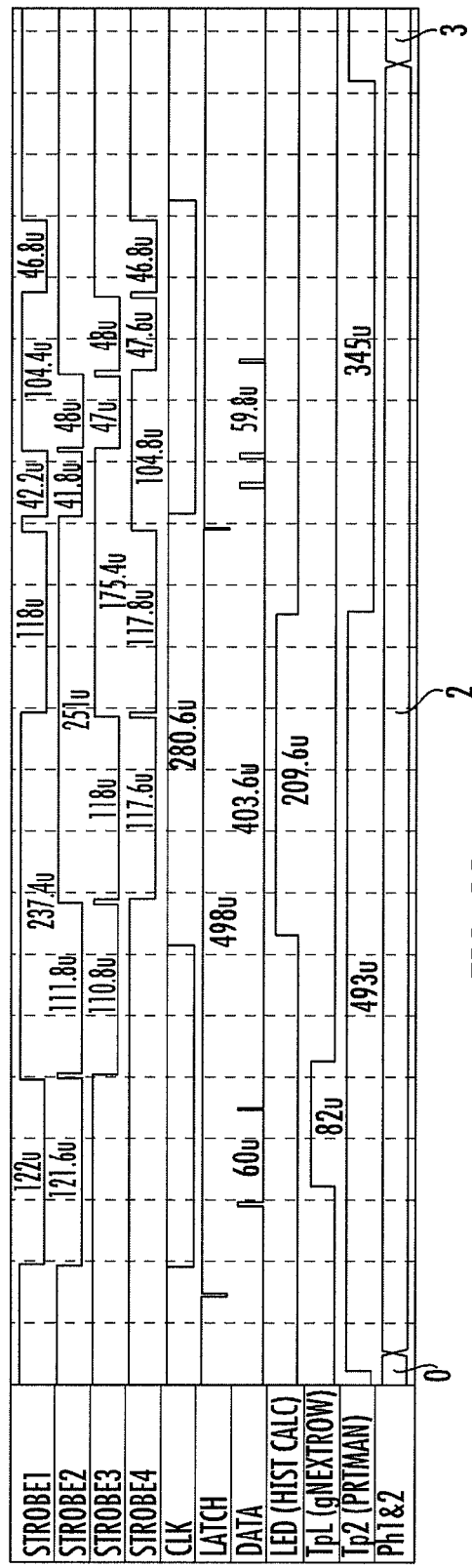
FIG. 11 shows a graphical representation of a strobe pattern consistent with some embodiments.

Rather than activate all or one of the sets (or sections) of the heating elements, embodiments of the present invention can selectively activate sets according to a particular pattern, referred to herein as a strobe pattern. FIG. 11 illustrates a graphical representation of an example of such a strobe pattern. As in FIG. 11, each row has four sets of heating elements and each set is in communication with a driving circuit. The leftmost column of the graph shows, among other things, Strobe1, Strobe2, Strobe3, and Strobe4. Strobe1 represents a first driving circuit in communication with a first set of heating elements. Strobe2 represents a second driving circuit in communication with a second set of heating elements. Strobe3 represents a third driving circuit in communication with a third set of heating elements. Strobe4 represents a fourth driving circuit in communication with a fourth set of heating elements. To the right of the column is a horizontal line that represents the time when a particular set of heating elements is activated. The line only has two vertical positions wherein the top position represents the set of heating elements being OFF and the bottom position represents the set of the heating elements being ON (or activated). The horizontal distance represents time. For example, Strobe 1 shows that the first set of heating elements starts the process OFF and then is turned ON for 122 microseconds (μs), turned OFF for 237.4 microseconds, turned ON for 118 microseconds, turned OFF very briefly, turned ON for 42.2 microseconds, turned OFF for 104.4 microseconds, turned ON for 46.8 microseconds, and turned OFF for the rest of the graph's time period. As another example, Strobe2 shows the second set of heating elements starts the process OFF and then is turned ON (at the same time that the first set of heating elements is first turned ON) for 121.6 microseconds, turned OFF very briefly, turned ON for 111.8 microseconds, turned OFF for 251 microseconds, turned ON for 41.8 microseconds, turned OFF very briefly, turned ON for 48 microseconds, and turned OFF for the rest of the graph's time period.

In strobe pattern of FIG. 11, each set of heating elements is activated twice with a short delay (i.e., there is relatively brief period in which the set of heating elements is turned off between the two activation periods). This allows the controller (e.g. controller 1145) to better control the printhead from absorbing too much power while maintaining a certain heat level in the set of heating elements (e.g., the brief period of deactivation can be configured so it is too short to allow the heating elements to cool off completely which would then require more power to reactivate the heating elements, while still allowing for power conservation as compared to just one long activation period without any period of deactivation). The optimal time period for the interruption between activation periods may vary among printing devices, printheads and other factors. For example, the time period for the interruption may be based on the thermo properties of the printhead (i.e., the rate at which the printhead absorbs, reflects, or radiate heat). The longer it takes for the printhead to cool then the longer the interruption may be configured to be, without having a significant effect on the temperature of the printhead. Typically if a printhead takes a long time to cool, it often takes a long time to heat and, thus, the activation period of (or the time needed to sufficiently heat) the heating elements may be longer too.

As evident in the illustrated strobe pattern, the sets of heating elements are fired in pairs in the following order: 1-2 (i.e., the first and second sets of heating elements); 2-3, 3-4, and 4-1. In the beginning with the 1-2, the power supply may be fully charged such that it provides a full power value. After awhile, the power supply may be configured to begin draining, which may lead to a slight faint in the print. It is believed that by activating the same set of heating elements in a row with a brief interruption, the set of heating elements may reuse heat from the first period of activation (also referred to as a "pulse") during the second period of activation, because the pulse frequency can be configured such that not enough time has passed to allow the set of heating elements to cool between pulses. The brief interruption may also help the power source to recharge. During the 4-1 activation, although the first set of heating elements has had the most time to cool, it was configured to receive the most power as the first set of heating elements to be activated during a full charge. Therefore, it is beneficial to have the last and more drained pulse include the first set of heating elements.

As shown in FIG. 11, the first set of pulses for each set of heating elements is configured to be (approximately) 110 to 122 microseconds, which may be considered long for primary pulses. As the power is drained the pulses are configured to be shorter, shown from around 41 microseconds to 48 microseconds, and are referred to as short or secondary pulses. According to the pattern shown in FIG. 11, the pattern of the primary pulses and the pattern of the second pulses are configured to be substantially the same.

The shown strobe pattern is intended as an example and not as a limitation. One in the art would appreciate that other embodiments may have different strobe patterns in which the heating elements are selectively activated and, for example, the pattern may include two pulses with a brief interruption. The optimal length of the pulses and the interruption may vary among printing devices, printheads, media, and based on other factors. The preferred strobe pattern may become part of a profile for a particular type of media as disclosed herein. In other words, the strobe pattern may be used as a means to achieve a particular print quality. Similarly, rather than or in addition to having profiles directed to print quality, the strobe patterns may establish a profile for conserving energy. A manufacturer of the power supply or the printing device may determine an optimal strobe pattern that, for example, maintains a print quality level while optimizing energy use and conservation.

One skilled in the art would appreciate the benefits and advantages that the embodiments disclosed herein provide. For example, the profiles provide improved flexibility for a printing device to accommodate a wide variety of supplies or applications while providing a desired print quality. Moreover, compared to other systems, the profiles may allow the printing device to be configured to adjust one or more parameters automatically and/or dynamically (e.g., without requiring input from an operator). Embodiments may also provide end users with more flexibility in terms of choosing suppliers or in stocking different supplies at different locations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving one or more profiles, wherein each of the profiles is associated with a type of media;
   receiving a media of a first type of media;
   identifying the first type of media;
   identifying a profile associated with the first type of media;
   adjusting at least one printing parameter of a printing device based on the profile associated with the first type of media; and
   applying an offset to the profile based on the printing device.

2. The method according to claim 1, wherein identifying the first type of media includes reading a barcode associated with the media.

3. The method of claim 1 further comprising:
   determining an ambient temperature of the environment prior to adjusting the at least one printing parameter; and
   adjusting a temperature printing parameter at least partially based on the ambient temperature.

4. The method of claim 3, wherein adjusting the temperature printing parameter comprises:
   processing an equation that is a function of a temperature coefficient associated with the printing device.

5. A printing device comprising:
   a memory element configured to store a profile for each of a plurality of types of media;
   a printhead configured to print indicia on the plurality of types of media based on at least one printing parameter; and
   a controller configured to:
      identify a first type of media received by the printing device;
      identify a profile stored in the memory element associated with the first type of media;
      adjust the at least one printing parameter based on the profile; and
      apply an offset to the profile based on the printing device.

6. The printing device according to claim 5 further comprising an input element for receiving one or more profiles.

7. The printing device according to claim 5 further comprising a conveyance apparatus configured to convey media through the printing device, wherein the conveyance apparatus defines a print speed and, wherein the controller is further configured to adjust the print speed based on the profile.

8. The printing device according to claim 5, wherein the profile includes a strobe pattern.

9. The printing device according to claim 8, wherein the strobe pattern includes a series of first and second pulses separated by a brief interruption.

10. The printing device according to claim 5 further comprising a sensor configured to read indicia from the first type of media, wherein the controller is further configured to identify the first type of media in response to the sensor reading the indicia.

11. The printing device according to claim 5 further comprising a RFID reader configured to read information from a supply of the first type of media, wherein the controller is further configured to identify the first type of media in response to the RFID reader reading the information from the supply.

12. The printing device of claim 5 further comprising:
   a temperature sensor that determines an ambient temperature of the environment local to the printing device.

13. The printing device of claim 5 further comprising:
   a network component that is configured to communicate with a remote data server to download the profile to the memory element.

* * * * *